US009219974B2

(12) United States Patent
Ko et al.

(10) Patent No.: US 9,219,974 B2
(45) Date of Patent: Dec. 22, 2015

(54) METHOD AND APPARATUS FOR SIMULTANEOUSLY CONTROLLING NEAR SOUND FIELD AND FAR SOUND FIELD

(75) Inventors: Sang Chul Ko, Seoul (KR); Young Tae Kim, Seongnam-si (KR); Jung Woo Choi, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 847 days.

(21) Appl. No.: 13/064,948

(22) Filed: Apr. 27, 2011

(65) Prior Publication Data

US 2012/0014525 A1 Jan. 19, 2012

(30) Foreign Application Priority Data

Jul. 13, 2010 (KR) ........................ 10-2010-0067324

(51) Int. Cl.

| | |
|---|---|
| ***H04R 5/00*** | (2006.01) |
| ***H04B 3/00*** | (2006.01) |
| ***H04R 5/02*** | (2006.01) |
| ***H04S 7/00*** | (2006.01) |
| ***H04S 1/00*** | (2006.01) |
| ***H04S 5/02*** | (2006.01) |
| ***H04S 5/00*** | (2006.01) |
| *H04R 27/00* | (2006.01) |
| *H04H 20/83* | (2008.01) |

(Continued)

(52) U.S. Cl.

CPC ................ *H04S 7/302* (2013.01); *H04S 1/002* (2013.01); *H04S 5/00* (2013.01); *H04S 5/02* (2013.01); *H04S 7/40* (2013.01); *H04H 20/83* (2013.01); *H04R 1/403* (2013.01); *H04R 5/04* (2013.01); *H04R 27/00* (2013.01); *H04R 2217/03* (2013.01); *H04S 3/00* (2013.01); *H04S 2420/01* (2013.01)

(58) Field of Classification Search

CPC ....... H04S 1/002; H04S 5/00; H04S 2420/01; H04S 5/02; H04S 3/00; H04S 3/02; H04S 7/40; H04R 27/00; H04R 2217/03; H04R 5/04; H04H 20/83

USPC .......................... 381/17–19, 77, 80, 300–310

See application file for complete search history.

(56) References Cited

U.S. PATENT DOCUMENTS

| | | | | |
|---|---|---|---|---|
| 5,870,484 | A * | 2/1999 | Greenberger | 381/300 |
| 7,088,828 | B1 * | 8/2006 | Bradford et al. | 381/71.1 |

(Continued)

FOREIGN PATENT DOCUMENTS

| | | |
|---|---|---|
| JP | 2009-010475 | 1/2009 |
| KR | 10-2005-0013323 | 2/2005 |

(Continued)

*Primary Examiner* — Matthew Eason
*Assistant Examiner* — Sean H Nguyen
(74) *Attorney, Agent, or Firm* — Staas & Halsey LLP

(57) ABSTRACT

An apparatus and method for forming a Personal Sound Zone (PSZ) at a location of a listener are provided. An apparatus for simultaneously controlling a near sound field and a far sound field may classify the near sound field and the far sound field based on a distance between an array speaker and a listener, and may control the near sound field and the far sound field and thus, it is possible to perform focusing even when the listener is located in adjacent to the array speaker. Additionally, the apparatus may generate a directive sound source using the array speaker, and at the same time, may reduce a sound pressure in a far field, thereby reducing a sound source spreading to the far field while focusing is performed at the location of the listener.

24 Claims, 19 Drawing Sheets

(51) Int. Cl.

| | |
|---|---|
| *H04R 1/40* | (2006.01) |
| *H04R 5/04* | (2006.01) |
| *H04S 3/00* | (2006.01) |

(56) References Cited

U.S. PATENT DOCUMENTS

| | | | | |
|---|---|---|---|---|
| 7,167,567 | B1 * | 1/2007 | Sibbald et al. | 381/17 |
| 7,269,452 | B2 * | 9/2007 | Cheung et al. | 455/575.6 |
| 7,548,764 | B2 * | 6/2009 | Jin et al. | 455/562.1 |
| 7,844,010 | B2 * | 11/2010 | Ylitalo et al. | 375/267 |
| 2004/0131338 | A1 * | 7/2004 | Asada et al. | 386/96 |
| 2004/0240697 | A1 * | 12/2004 | Keele, Jr. | 381/336 |
| 2005/0141726 | A1 * | 6/2005 | Houg | 381/59 |
| 2006/0262935 | A1 * | 11/2006 | Goose et al. | 381/17 |
| 2006/0280315 | A1 * | 12/2006 | Norris et al. | 381/77 |
| 2009/0034762 | A1 * | 2/2009 | Konagai et al. | 381/300 |
| 2009/0041254 | A1 * | 2/2009 | Jin et al. | 381/1 |
| 2009/0087000 | A1 * | 4/2009 | Ko | 381/182 |
| 2009/0097666 | A1 * | 4/2009 | Kim et al. | 381/59 |
| 2009/0097668 | A1 * | 4/2009 | Kim et al. | 381/71.1 |
| 2009/0136045 | A1 * | 5/2009 | Kim et al. | 381/17 |
| 2009/0141915 | A1 * | 6/2009 | Ko et al. | 381/182 |
| 2009/0154723 | A1 * | 6/2009 | Choi et al. | 381/80 |
| 2010/0061571 | A1 * | 3/2010 | Choi et al. | 381/160 |
| 2010/0092005 | A1 * | 4/2010 | Dunn et al. | 381/77 |
| 2010/0104117 | A1 | 4/2010 | Keele, Jr. | |
| 2010/0110418 | A1 * | 5/2010 | Shapirov | 356/237.1 |
| 2010/0157740 | A1 * | 6/2010 | Ko et al. | 367/138 |
| 2010/0322337 | A1 * | 12/2010 | Ylitalo et al. | 375/267 |
| 2010/0322435 | A1 * | 12/2010 | Suzuki et al. | 381/92 |
| 2010/0329489 | A1 * | 12/2010 | Karaoguz | 381/307 |
| 2011/0103620 | A1 * | 5/2011 | Strauss et al. | 381/150 |

FOREIGN PATENT DOCUMENTS

| | | |
|---|---|---|
| KR | 10-2005-0056893 | 6/2005 |
| KR | 10-2006-0018623 | 3/2006 |
| KR | 10-2006-0052164 | 5/2006 |
| KR | 10-2008-0071805 | 8/2008 |
| KR | 10-2009-0033722 | 4/2009 |
| KR | 10-2009-0058224 | 6/2009 |
| KR | 10-2009-0066090 | 6/2009 |
| KR | 10-2009-0082978 | 8/2009 |
| KR | 10-2009-0110598 | 10/2009 |

* cited by examiner

METHOD AND APPARATUS FOR SIMULTANEOUSLY CONTROLLING NEAR SOUND FIELD AND FAR SOUND FIELD

CROSS-REFERENCE TO RELATED APPLICATIONS

This application claims the benefit of Korean Patent Application No. 10-2010-0067324, filed on Jul. 13, 2010, in the Korean Intellectual Property Office, the disclosure of which is incorporated herein by reference.

BACKGROUND

1. Field

Example embodiments of the following description relate to an apparatus and method for forming a Personal Sound Zone (PSZ) at a location of a listener.

2. Description of the Related Art

Recently, research is actively being conducted in the area of Personal Sound Zone (PSZ) technologies that may transfer sound to only a particular listener without using ear phones or headsets, rather than generating noise to other people. A technique of forming a PSZ may include a technique of using a directivity of sound generated when a plurality of sound transducers are driven, and a technique of changing an attenuation rate of sound radiated in a far field. In a conventional technology for focusing sound in a predetermined direction using an array source, sound may be directed in a predetermined direction, however, it is impossible to control an energy spreading to the rear of a listener by sound propagating farther in the predetermined direction.

SUMMARY

The foregoing and/or other aspects are achieved by providing an apparatus for simultaneously controlling a near sound field and a far sound field, including a filter generating unit to generate a filter, the filter having a higher sound pressure at a location of a listener compared with a location around the listener based on a ratio of a sound pressure energy at the location of the listener to a sound pressure energy obtained by summing sound pressure energies of a first dark zone and a second dark zone, and the filter controlling a sound pressure attenuation based on a distance in the second dark zone, a filter processing unit to process a filter value of the generated filter and an input signal and to generate a multi-channel signal, and an output unit to output the multi-channel signal.

The filter generating unit may include a near-field setting unit to set a near-field region based on the location of the listener, and a region classifying unit to classify the near-field region into the location of the listener and the first dark zone of the location around the listener, and to classify a far-field region spaced by a predetermined distance from the location of the listener, as the second dark zone.

The filter generating unit may include a beam width determination unit to determine a beam width of the multi-channel signal by applying a weight based on the sound pressure at the location of the listener, a beam pattern determination unit to determine a beam pattern of the near sound field by applying a weight based on a sound pressure attenuation in the near sound field in the first dark zone, a radiation pattern determination unit to determine a radiation pattern of the far sound field by applying a weight based on a sound pressure attenuation in the far sound field in the second dark zone, and a control weight applying unit to apply a control weight to a factor controlling the beam pattern of the near sound field and a factor controlling the radiation pattern of the far sound field, the control weight being used to simultaneously control the near sound field and the far sound field.

The control weight applying unit may apply the control weight so that a first control weight applied to the factor controlling the beam pattern of the near sound field may be inversely proportional to a second control weight applied to the factor controlling the radiation pattern of the far sound field.

The filter processing unit may include a convolution processing unit to perform a convolution processing on the filter value and the input signal in real-time, and to generate the multi-channel signal.

The filter processing unit may include a gain/delay processing unit to process the input signal using a gain value and a delay value, set in advance.

The filter generating unit may generate a filter for simultaneously controlling the near sound field and the far sound field, based on information of a transfer function from each of array speakers to the location of the listener and information of a transfer function from each of the array speakers to a location of the far field.

The information of the transfer function may include information of a transfer function based on a theoretically modeled sound source.

The information of the transfer function may include information of a transfer function directly measured using a microphone at the location of the listener and another microphone in the location of the far field.

The filter generating unit may include an array aperture size determination unit to determine an array aperture size based on a frequency of the input signal and a fixed Rayleigh distance, and a use range setting unit to set a use range of an array based on the determined array aperture size.

The use range setting unit may include a group setting unit to set array speakers in array groups having different sizes, and a signal assigning unit to assign the input signal to the set array groups based on a corresponding frequency band.

The use range setting unit may process, in a channel signal, a window filter calculated based on the determined array aperture size, and may set the use range of the array.

The filter generating unit may include, for example, a focal point change unit to change a focal point in the front or rear of the listener based on the frequency of the input signal, so that a beam width is maintained at a location of ears of the listener.

The output unit may include an array speaker unit to output the multi-channel signal via an array speaker.

The foregoing and/or other aspects are achieved by providing a method for simultaneously controlling a near sound field and a far sound field, including generating a filter, the filter having a higher sound pressure at a location of a listener compared with a location around the listener based on a ratio of a sound pressure energy at the location of the listener to a sound pressure energy obtained by summing sound pressure energies of a first dark zone and a second dark zone, and the filter controlling a sound pressure attenuation based on a distance in the second dark zone, processing a filter value of the generated filter and an input signal and generating a multi-channel signal, and outputting the multi-channel signal.

The generating may include setting a near-field region based on the location of the listener, and classifying the near-field region into the location of the listener and the first dark zone of the location around the listener and classifying a far-field region spaced by a predetermined distance from the location of the listener as the second dark zone.

The generating may include determining a beam width of the multi-channel signal by applying a weight based on the sound pressure at the location of the listener, determining a beam pattern of the near sound field by applying a weight based on an attenuation of a near-field sound pressure in the first dark zone, determining a radiation pattern of the far sound field by applying a weight based on an attenuation of a far-field sound pressure in the second dark zone, and applying a control weight to a factor controlling the beam pattern of the near sound field and a factor controlling the radiation pattern of the far sound field, the control weight being used to simultaneously control the near sound field and the far sound field.

The generating may include determining an array aperture size based on a frequency of the input signal and a constant Rayleigh distance, and setting a use range of an array based on the determined array aperture size.

The generating may include changing a focal point in a rear side or a front side of the listener based on the frequency of the input signal, so that a beam width is maintained at the location of the listener.

Additional aspects, features, and/or advantages of example embodiments will be set forth in part in the description which follows and, in part, will be apparent from the description, or may be learned by practice of the disclosure.

According to example embodiments, it is possible to classify a near sound field and a far sound field based on a distance between an array speaker and a listener, and to control the near sound field and the far sound field, so that focusing may be performed even when the listener is located in adjacent to the array speaker.

Additionally, according to example embodiments, it is possible to generate a directive sound source using an array speaker and at the same time, to reduce a sound pressure in a far field, thereby reducing a sound source spreading to the far field while focusing is performed at a location of a listener.

Furthermore, according to example embodiments, when a sound source is focused in a listener near the sound source, a beam pattern of a near sound field may be controlled so that a sound pressure at a location of the listener may not be reduced and thus, it is possible to a higher sound pressure at the location of the listener compared with a location around the listener.

Moreover, according to example embodiments, when a listener is located in adjacent to a multimedia device, a sound source may be focused at a location of the listener, and a sound source radiated to the rear of the listener may be controlled, thereby generating a Personal Sound Zone (PSZ).

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1A:
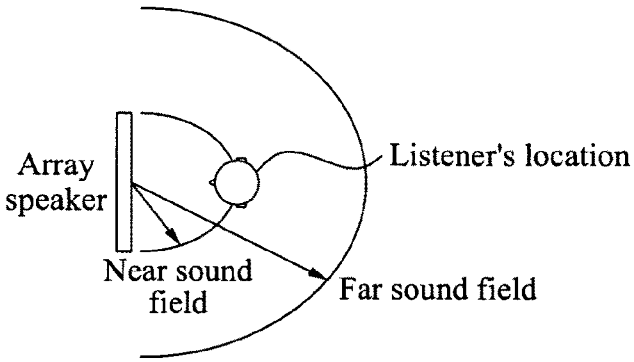
FIG. 1A illustrates a diagram of a near sound field and a far sound field set based on a location of a listener according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

An array speaker may combine a plurality of speakers, and may be used to control a play back direction of sound, or may be used to transfer sound to a predetermined region. A sound transfer principle, referred to as a directivity, indicates that signals are transferred in a predetermined direction by overlapping signals so that strength of signals may be increased in the predetermined direction based on a phase difference between multiple sound source signals. Accordingly, the plurality of speakers may be arranged based on a predetermined location and a sound source signal output through each of the plurality of speakers that form an array may be controlled, so that directivity may be realized. In a general array speaker system, filter values, namely gain and delay values, may be calculated in advance based on a desired beam pattern, and may be used, in order to obtain the desired frequency beam pattern.

Among terms used in example embodiments, the term "sound pressure" is used to represent a force influenced by a sound energy using a physical amount of a pressure, and the term "sound field" is used to conceptually represent a region influenced by sound pressure based on a sound source. Accordingly, a near sound field refers to a sound field in a near-field region, and a far sound field refers to a sound field in a far-field region. Additionally, a term "focusing" means forming a directivity in a predetermined direction through an array speaker, and a term "sound pressure attenuation" means a reduction in sound energy transferred in accordance with a distance. Furthermore, a term "beam pattern" may be represented with a graph by measuring a sound intensity of a sound wave radiated 360° in all directions from a signal output apparatus such as a speaker, an antenna, and the like, or by measuring an electric field strength of an electromagnetic wave. A beam pattern may be obtained by receiving signals in all directions of 360° of a speaker targeted by a measuring device measuring an output signal, and by displaying an intensity of a sound wave received for each measured angle on a polar chart using waveforms.

FIG. 1A illustrates a diagram of a near sound field and a far sound field set based on a location of a listener according to example embodiments.

To control a sound spreading to a rear of the listener when forming a Personal Sound Zone (PSZ) using an array speaker in an electronic device for individual use, for example a monitor, there is a need to form a directive sound source in a near sound field and to simultaneously control a far sound field. Here, the far sound field refers to the rear of the listener based on the location of the listener. In an example of forming a sound field using the array speaker, a Rayleigh distance may be used to classify a far sound field and a near sound field. The Rayleigh distance may be described as a distance at which a difference between a distance from an outermost edge of the array speaker to the listener and a distance from a center of the array speaker to the listener corresponds to ¼ of the sound source wavelength. A distance less than the Rayleigh distance may be defined as a near sound field, and a distance greater than the Rayleigh distance may be defined as a far sound field.

The near sound field and the far sound field need to be controlled in different manners, so that focusing may be performed at the location of the listener in the near sound field, and that a sound pressure may be greatly attenuated in the far sound field. To simultaneously control the near sound field and the far sound field, a sound source needs be controlled using a scheme different from a conventional beamforming scheme. When a listener is located near an array source, a region to which a sound is transferred by a sound source may be classified into a first dark zone where a PSZ and a near sound field may be controlled, and a second dark zone where a far sound field may be controlled. The first dark zone may be a region excluding the PSZ from the near sound field. The PSZ may enable maintaining of a constant sound pressure, and may be set in advance. Here, a region from the sound source to the location of the listener may be set as a near-field region, and a region spaced by a predetermined distance or greater from the listener may be set as a far-field region. The near-field region and the far-field region may be controlled using different objective functions, so that the sound pressure may be maximized at the location of the listener and that the sound pressure may be reduced in the far field at the rear of the listener.

Figure 1B:
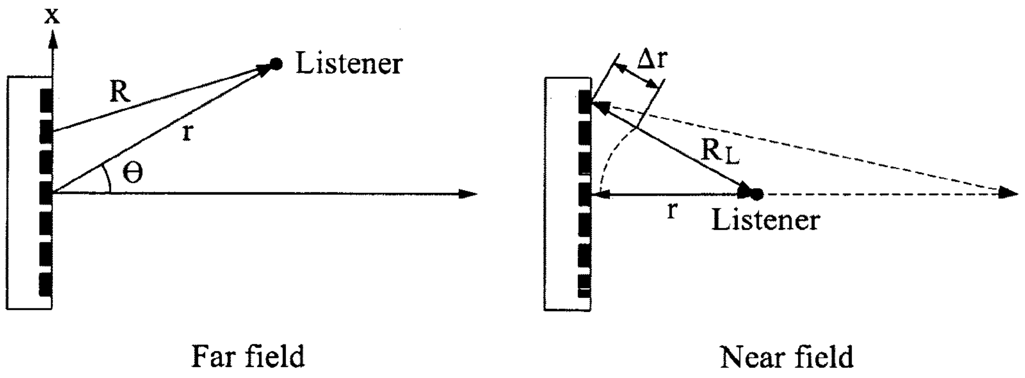
FIG. 1B illustrates a diagram of a relationship between an array speaker and a listener based on a distance between the array speaker and the listener, using a coordinate system according to example embodiments.

FIG. 1B illustrates a diagram of a relationship between an array speaker and a listener based on a distance between the array speaker and the listener, using a coordinate system.

A distance attenuation rate of a beam generated using an array speaker may have a characteristic that varies depending on a beam propagation distance. When a distance from an array speaker to the listener is sufficiently greater than a size of the array speaker, a sound pressure of the beam may be reduced in inverse proportion to the distance, similarly to a general monopole sound source. A size of the array speaker may refer to, as an example, a length of the housing including the plurality of speakers making up the array speaker used as the sound source.

Referring to FIG. 1B, in a far field, when a distance between a listener spaced by a distance "r" in a direction of angle θ from a center of the array speaker and a speaker isolated by a distance "x" from the center of the array speaker is denoted by "R", the distance "R" may be represented by Equation 1 below. Additionally, a sound pressure at the location of the listener may be represented by Equation 2 as below.

$$R=\sqrt{r^2+x^2-2xr\sin\theta}\cong r-x\sin\theta \quad \text{[Equation 1]}$$

$$p(r,\theta)=\int\frac{q(x)}{R}e^{jkR}dx\cong\frac{A}{r}e^{jkr}\int q(x)e^{-jk\sin\theta x}dx \quad \text{[Equation 2]}$$

In Equation 2, q(x) denotes a control signal of a speaker at a location "x". The sound pressure may be briefly represented using a function of a distance and a direction, as given in Equation 3.

$$p(r,\theta)\propto\frac{b(\theta)}{r} \quad \text{[Equation 3]}$$

Accordingly, the sound pressure of the beam may be reduced in inverse proportion to the distance, and a shape of the beam b(θ) based on a direction may have a constant characteristic regardless of the distance.

However, in a near field where the listener is located closer to the array speaker than in the far field, a relationship of Equation 3 is not achieved, and an interference of a sound wave may occur in a complex form in each speaker. In Equation 2, an example where the listener is located in the near field in a front direction (θ=0) may be considered. In this example, the listener may be located close to the array speaker, and a distance "RL" between the listener and the speaker may be rapidly changed for each speaker and thus, a phase "kR" in Equation 2 may be rapidly changed. Here, a sound pressure in the near field may be approximated using a stationary phase approximation scheme, as given in Equation 4.

$$p(r,\theta)\propto\sqrt{\frac{2\pi}{k}}\,e^{j\pi/4}\left(\frac{e^{jkr}}{\sqrt{r}}\right) \quad \text{[Equation 4]}$$

In other words, the sound pressure at the location of the listener may be slowly attenuated in proportion to a square root of the distance. It may be predicted that the sound pressure in the near sound field and the far sound field may be changed depending on the distance through Equations 3 and 4, with reference to FIG. 1C.

Figure 1C:
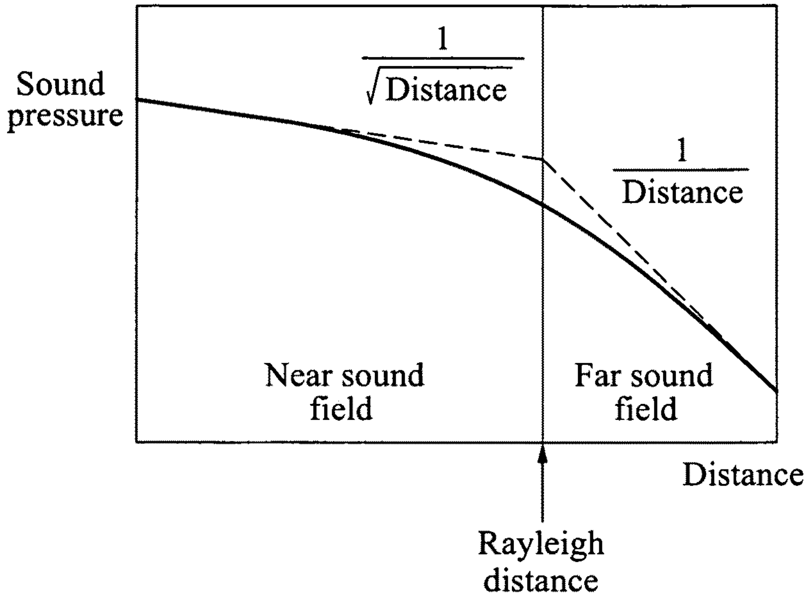
FIG. 1C illustrates a diagram of a change in a sound pressure depending on a distance between an array source and a listener according to example embodiments.

FIG. 1C illustrates a change in a sound pressure depending on a distance between an array source and a listener.

In the case of a beam pattern using a general array technology, a sound pressure may be slowly attenuated in inverse proportion to the square root of the distance in the near sound field, and may have an attenuation rate in inverse proportion to the distance in the far sound field. Accordingly, there is a need to increase the sound pressure in the location of the listener by reducing the sound pressure attenuation rate in the near sound field, and by increasing a sound pressure attenuation rate in the far field of the rear of the listener, so that focusing may be performed in the near sound field and so that the sound pressure may be greatly attenuated in the far sound field. However, when an array speaker is used, a sound pressure attenuation rate of the far sound field may be physically limited to a form of 1/distance (1/r). Accordingly, the Rayleigh distance that starts to be attenuated in the form of 1/distance (1/r) may be set to correspond to the location of the listener, instead of changing the sound pressure attenuation rate of the far sound field, thereby maximizing the sound pressure in the location of the listener and rapidly reducing a sound spreading to the rear of the listener.

The Rayleigh distance may be changed depending on an array size and a wavelength of a sound source. Here, the array size refers to a size of an array speaker used as a sound source among all array speakers. The Rayleigh distance may be increased as the array size increases. Additionally, as the wavelength is reduced, that is as a frequency increases, the Rayleigh distance may be increased. Accordingly, the array size may be adjusted variably depending on the location of the listener and a frequency of the sound source and thus, it is possible to maintain a Rayleigh distance corresponding to the location of the listener.

Figure 2:
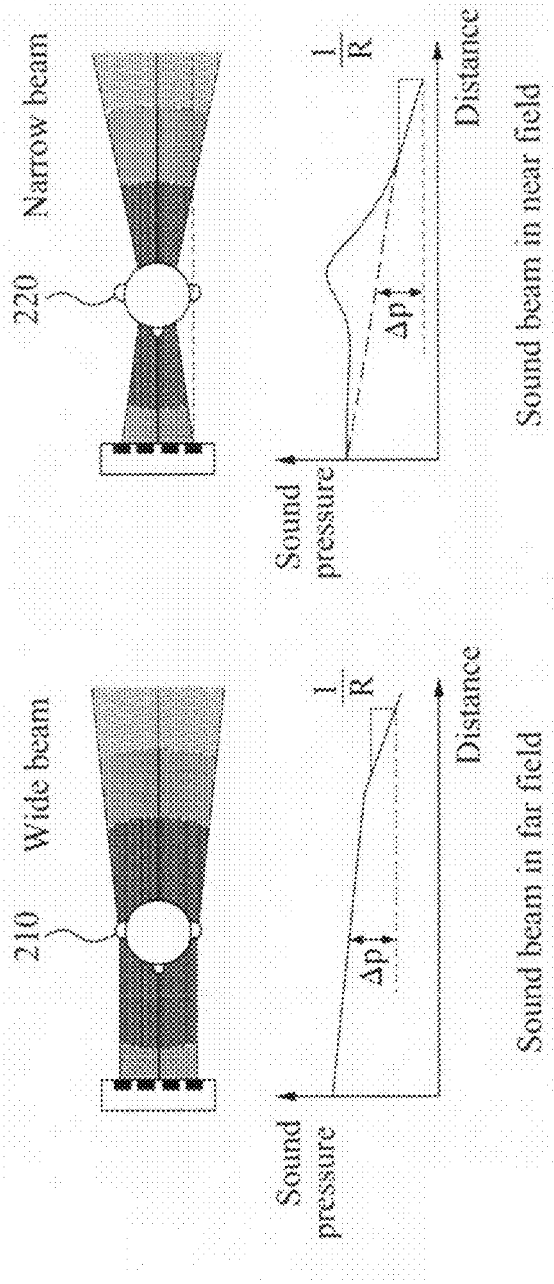
FIG. 2 illustrates a diagram of a distance attenuation characteristic based on a beam width of a sound beam according to example embodiments.

FIG. 2 illustrates a distance attenuation characteristic based on a beam width of a sound beam.

In a high frequency sound, a sound pressure at a location of the ears of the listener may be reduced rather than being maintained, as the beam width becomes less than a size of the listener's head. When a directive sound source is formed using the array source, the high frequency may have a relatively narrow beam width.

Referring to FIG. 2, in an example, a sound beam in a far field may be formed as a wide beam while maintaining a sound pressure in both ears of a listener 210. However, since the sound pressure continues to be attenuated at the rear of the listener 210 at an equal ratio, it is difficult to effectively form a PSZ. In another example, a sound beam in a near field may be formed as a narrow beam. Here, a sound pressure may be increased at a location of a listener 220 and accordingly, the sound pressure may be relatively rapidly attenuated in the rear of the listener 220. However, since the sound pressure is not maintained in both ears of the listener 220, a focusing effect in a near sound field may not occur. Accordingly, there is a desire for a method of rapidly attenuating the sound pressure while maintaining the sound pressure at the location of both ears of the listener.

Figure 3:
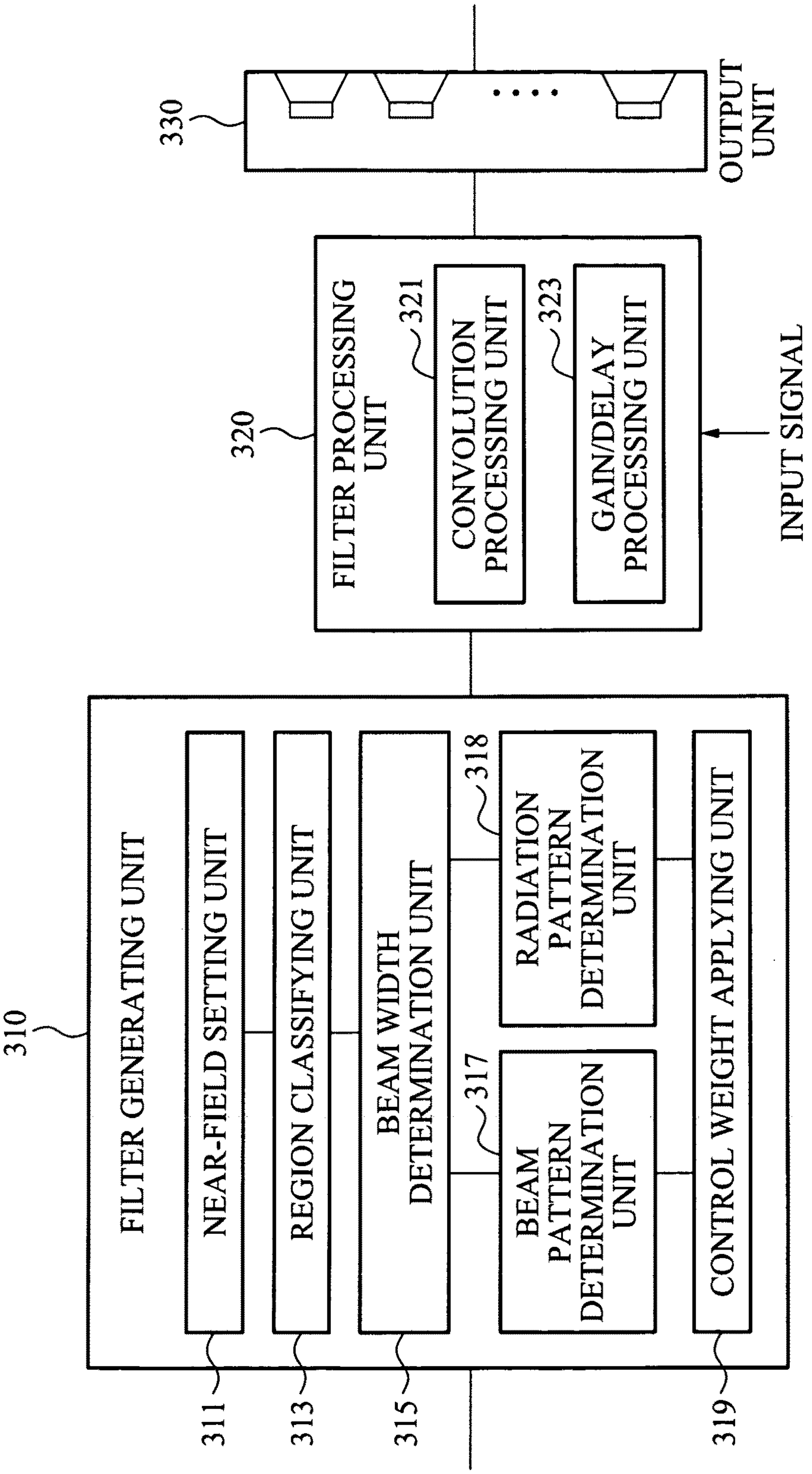
FIG. 3 illustrates a block diagram of an apparatus for simultaneously controlling a near sound field and a far sound field according to example embodiments.

FIG. 3 illustrates a block diagram of an apparatus for simultaneously controlling a near sound field and a far sound field according to example embodiments.

Referring to FIG. 3, the apparatus may include, for example, a filter generating unit 310, a filter processing unit 320, and an output unit 330.

The filter generating unit 310 may generate a filter. Here, the filter may be used to simultaneously control the near sound field and the far sound field based on a ratio of a sound pressure energy at a location of a listener to a sound pressure energy obtained by summing sound pressure energies of a first dark zone and a second dark zone.

Specifically, the filter generating unit 310 may generate a filter based on a ratio of the sound pressure energy at the location of the listener, where a beam width is determined so that a maximum sound pressure is maintained, to a sound pressure energy obtained by summing a sound pressure energy of the first dark zone and a sound pressure energy of the second dark zone. Here, in the first dark zone, a beam pattern may be determined so that a directivity to the location of the listener in the near sound field may be formed and so that the sound pressure may be attenuated, and in the second dark zone, a radiation pattern may be determined so that the sound pressure may be attenuated at the rear of the listener.

Additionally, the filter generating unit 310 may generate a filter that has a higher sound pressure at the location of the listener compared with a location around the listener and that is used to control a sound pressure attenuation based on a distance in the second dark zone.

The filter generating unit 310 may set a near-field region based on the location of the listener, and may classify the near-field region into a region of the listener and the first dark zone. Additionally, the filter generating unit 310 may set, as a far-field region, a region at the rear of the listener and at a side of the listener opposite to an array speaker, and may set the second dark zone.

The filter generating unit 310 may include, for example, a near-field setting unit 311, and a region classifying unit 313. The near-field setting unit 311 may set the near-field region based on the location of the listener. The region classifying unit 313 may classify the near-field region into the location of the listener and the first dark zone of the location around the listener, and may classify a far-field region spaced by a predetermined distance from the location of the listener, as the second dark zone. Here, the predetermined distance may include a distance from the rear of the listener. The near-field setting unit 311 may set the near-field region based on the location of the listener so that the Rayleigh distance may be located at the location of the listener.

Additionally, the filter generating unit 310 may include, for example, a beam width determination unit 315, a beam pattern determination unit 317, a radiation pattern determination unit 318, and a control weight applying unit 319. The beam width determination unit 315 may determine a beam width of the multi-channel signal by applying a weight based on the sound pressure at the location of the listener. The beam pattern determination unit 317 may determine a beam pattern of the near sound field by applying a weight based on a sound pressure attenuation in the near sound field in the first dark zone. The radiation pattern determination unit 318 may determine a radiation pattern of the far sound field by applying a weight based on a sound pressure attenuation in the far sound field in the second dark zone. Additionally, the control weight applying unit 319 may apply a control weight to a factor controlling the beam pattern of the near sound field and a factor controlling the radiation pattern of the far sound field. Here, the control weight may be used to simultaneously control the near sound field and the far sound field.

The control weight applying unit 319 may apply the control weight so that a first control weight applied to the factor controlling the beam pattern of the near sound field may be inversely proportional to a second control weight applied to the factor controlling the radiation pattern of the far sound field. In other words, when the first control weight is increased, the second control weight may be reduced. Conversely, when the second control weight is increased, the first control weight may be reduced.

Additionally, the filter generating unit 310 may generate a filter used to simultaneously control the near sound field and the far sound field based on information of a transfer function from each of the array speakers to the location of the listener and information of a transfer function from each of the array speakers to a location of a far field. Generating of a filter using a transfer function will be described in detail with reference to FIG. 4C. A scheme of using the information of the transfer function from each of array speakers to the location of the listener may equally be applied to a scheme of using the information of the transfer function from each of the array speakers to the location of the far field.

Here, the information of the transfer function may include either information of a transfer function based on a theoretically modeled sound source, or information of a transfer function directly measured using a microphone at the location of the listener and another microphone in the location of the far field.

The filter processing unit 320 may process a filter value of the generated filter and an input signal, and may generate a multi-channel signal. Here, the multi-channel signal may have a higher sound pressure at the location of the listener compared with the location around the listener, and may enable a sound pressure attenuation in the far field with respect to the input signal.

The filter processing unit 320 may include, for example, a convolution processing unit 321 to perform a convolution processing on the filter value of the filter and the input signal in real-time and to generate the multi-channel signal. The filter may be implemented as a Finite Impulse Response (FIR) filter, and may process the filter value, and a sound source signal input by a convolution scheme.

Additionally, the filter processing unit 320 may include, for example, a gain/delay processing unit 323 to process the input signal using a gain value and a delay value that are set in advance. The gain/delay processing unit 323 may be used to amplify an input signal, or to compensate for a delay caused by a phase difference in a point where focusing with a speaker is performed.

The output unit 330 may output the multi-channel signal. The output unit 330 may include an array speaker unit to output the multi-channel signal through an array speaker. The output unit 330 may also output the processed multi-channel signal as a sound beam through a speaker. The sound beam may be focused at the location of the listener, and the sound pressure may be attenuated in the rear side of the listener.

Figure 4A:
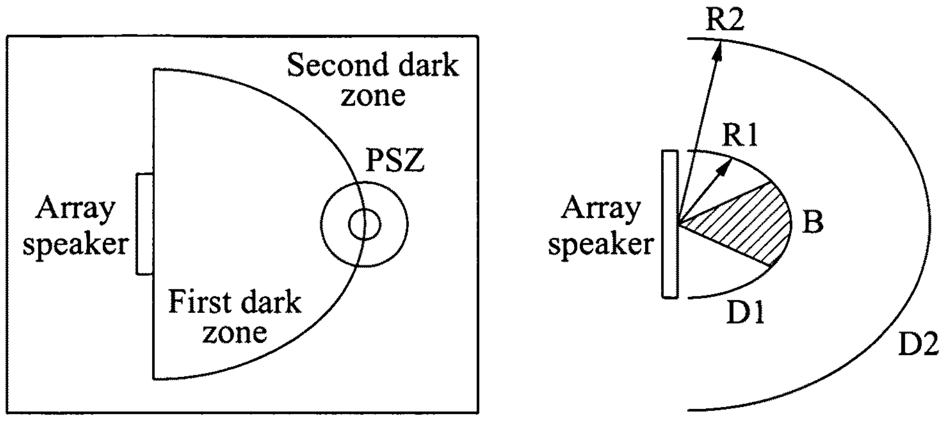
FIG. 4A illustrates a diagram of setting of a near sound field and a far sound field in an array speaker according to example embodiments.

FIG. 4A illustrates setting of a near sound field and a far sound field in an array speaker according to example embodiments.

Referring to FIG. 4A, a PSZ where a listener is located, a first dark zone where the near sound field is controlled, and a second dark zone where the far sound field is controlled may be separated based on distances from the array speaker. The first dark zone may refer to a zone obtained by excluding the PSZ from a near-field region formed based on the location of the listener. The PSZ may include a section where a sound pressure is maintained at a level greater than a constant level. In FIG. 4A, the PSZ in a near-field region "R1" may be denoted by "B", and the first dark zone obtained by excluding the PSZ "B" from the near-field region "R1" may be denoted by "D1". Additionally, the second dark zone may be denoted by "D2" in a far-field region "R2". Accordingly, an apparatus for simultaneously controlling a near sound field and a far sound field according to example embodiments may simultaneously control the PSZ "B", the first dark zone "D1", and the second dark zone "D2", so that the near sound field and the far sound field may be simultaneously controlled.

The filter generating unit 310 may use a cost function employing a maximum energy array scheme in order to simultaneously control the near sound field and the far sound field, and may generate a filter when a value of the cost function is maximized. The cost function may be set to simultaneously consider the near sound field and the far sound field by adjusting the control weight, and may be represented by the following Equation 5:

$$J = \frac{F_B \cdot I_B}{\alpha \cdot (F_{D1} \cdot I_{D1}) + (1-\alpha) \cdot (F_{D2} \cdot I_{D2})}, \quad \text{[Equation 5]}$$

$$I = \frac{E_\Theta}{A_\Theta} = \int_\Theta \frac{|H(w, \theta, r)|^2 d\theta}{\Theta}$$

In Equation 5, I denotes an average energy in an angle direction based on a location of a listener in an array speaker, α denotes a control weight, F denotes a weight function, and H denotes a response by a filter based on a distance and an angle.

The beam width determination unit 315 may determine a beam width through a weight function $F_B$ so that the sound pressure at the location of the listener may be maintained at a higher level than the sound pressure in the location around the listener. The beam pattern determination unit 317 may determine the beam pattern of the near sound field through a weight function $F_{D1}$, so that the beam pattern may have a directivity from the first dark zone to the location of the listener. The radiation pattern determination unit 318 may determine the radiation pattern of the far sound field through a weight function $F_{D2}$, so that the sound pressure may be attenuated in the second dark zone. The control weight applying unit 319 may control the beam pattern of the near sound field, and the radiation pattern of the far sound field, through α and 1−α of Equation 5.

Figure 4B:
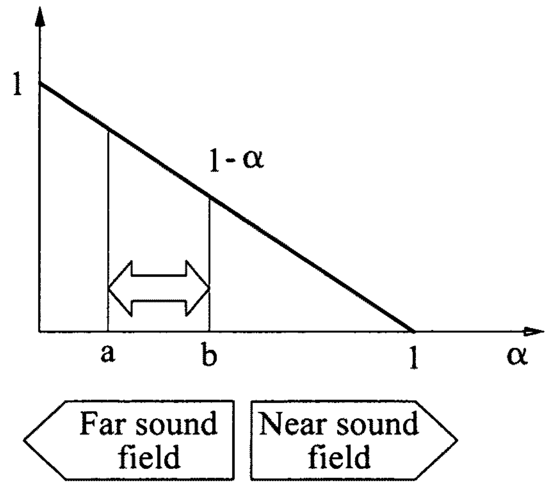
FIG. 4B illustrates a diagram of a change in a weight applicable to a control weight unit according to example embodiments.

FIG. 4B illustrates a change in a weight applicable to a control weight unit according to example embodiments.

In FIG. 4B, a denotes a weight used to simultaneously control the near sound field and the far sound field. Specifically, FIG. 4B illustrates a change in a sound field depending on a control weight. When α has a value of "1", only the near sound field may be controlled, and when a has a value of "0", only the far sound field may be controlled. FIG. 4B merely illustrates an example of a change in a control weight, and an applicable control weight may be changed based on a surrounding environment and a distance between an array speaker and a listener. Here, an applicable value of α may be selected by measurement of the surrounding environment.

Figure 4C:
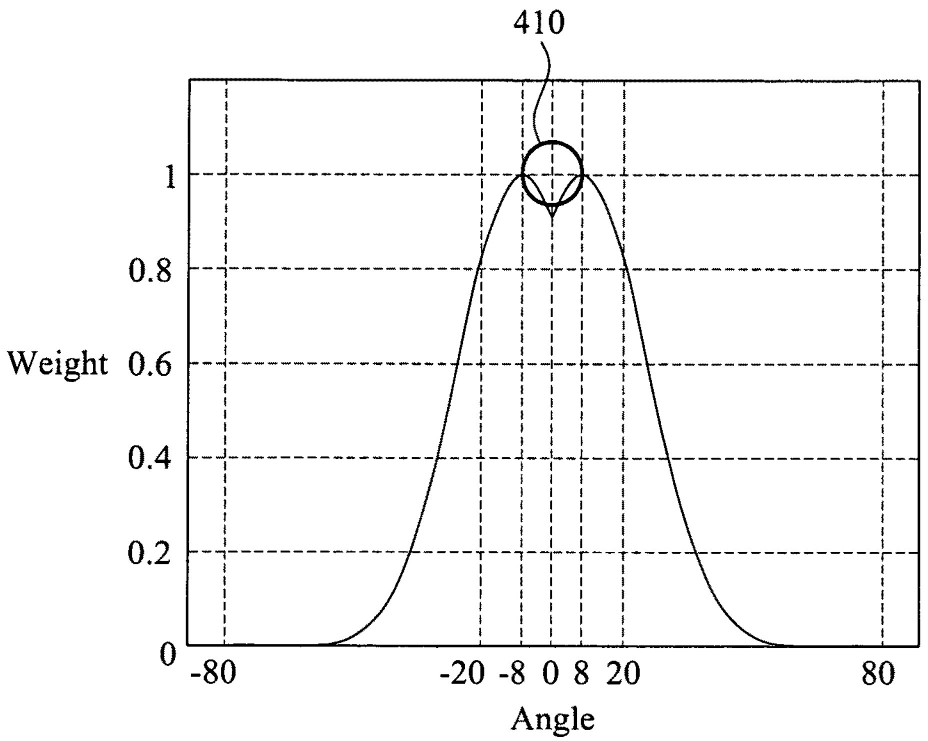
FIG. 4C illustrates a diagram of an example of a weight function applicable to a beam width determination unit according to example embodiments.

FIG. 4C illustrates an example of a weight function applicable to a beam width determination unit according to example embodiments.

The beam width determination unit 315 may determine a beam width so that a sound pressure at a location of both ears of the listener may be higher than the sound pressure in the location around the listener, and that focusing may be performed. The beam width determination unit 315 may apply a weight to a sound source energy reaching the location of the listener, and may determine the beam width. Referring to FIG. 4C, a weight may be adjusted to have a largest value at a location of both ears of a listener 410, that is, at angles −8° and 8°. Accordingly, a maximum sound pressure in the beam pattern may be maintained at the location of both ears of the listener. The weight may also be adjusted to have the largest value in all regions of a head of the listener 410, that is, at angles −8° and 8°.

Additionally, the beam width determination unit 315 may determine the beam width through the transfer function. A transfer function matrix between a speaker array device and a measurement location may be indicated by "G". The measurement location may be located in a predetermined distance including the location of the listener. A response Y in the measurement location with respect to an input signal "x" may be equal to Gu and G·wx (Y=Gu=G·wx). A response pattern by a filter "w" for controlling a beam width may be "H=Gw". When an objective function is set to have a constant beam width in the measurement location, a filter for maintaining a constant beam width may be calculated using the following Equation 6:

$$E=|D-H|^2=\|D-Gw|^2 \quad \text{[Equation 6]}$$

In Equation 6, D denotes a target pattern of an objective function with a constant beam width. When a Least Square Error (LSE) filter design scheme is applied to an error between the target pattern and a response pattern, an optimal filter "w" for controlling the beam width may be generated using the following Equation 7.

$$w=(G^H G)^{-1}G^H D \quad \text{[Equation 7]}$$

Figure 4D:
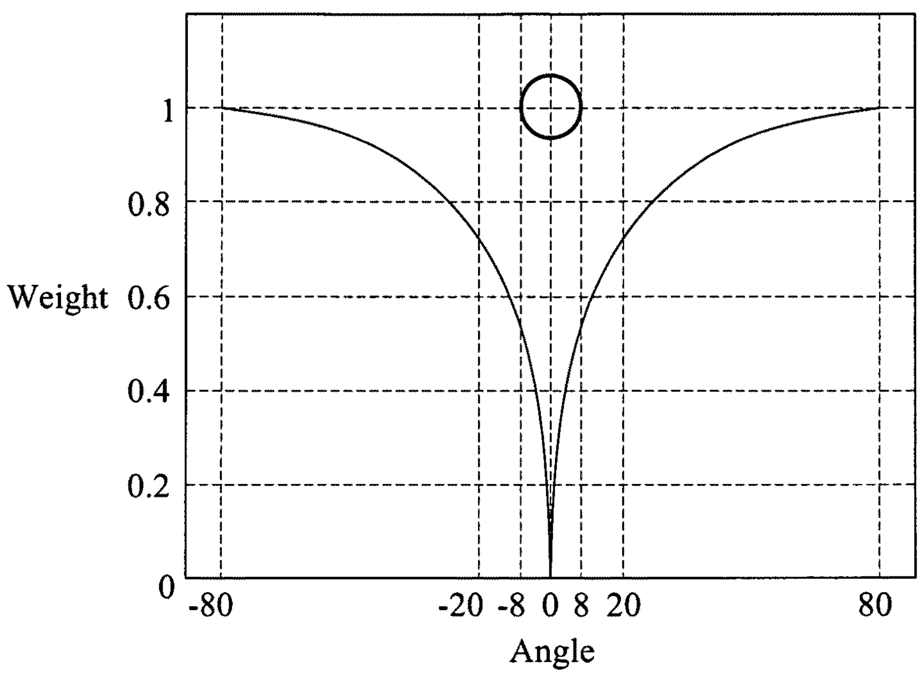
FIG. 4D illustrates a diagram of an example of a weight function applicable to a beam pattern determination unit according to example embodiments.

FIG. 4D illustrates an example of a weight function applicable to a beam pattern determination unit according to example embodiments.

The beam pattern determination unit 317 may determine a beam pattern of a region obtained by excluding the PSZ from the near field region. The beam pattern determination unit 317 may apply a weight to a sound source energy of the first dark zone, and may determine the beam pattern. Referring to FIG. 4D, a value of a weight function may be increased as a sound source moves from the center of the array speaker to an outermost edge of the array speaker. A sound pressure attenuation rate may be increased in the outermost edge having a large weight and thus, a directivity in a direction of the listener may be formed. Here, the weight function may be adjusted based on the location of the listener, an ambient noise, and an environment.

Figure 4E:
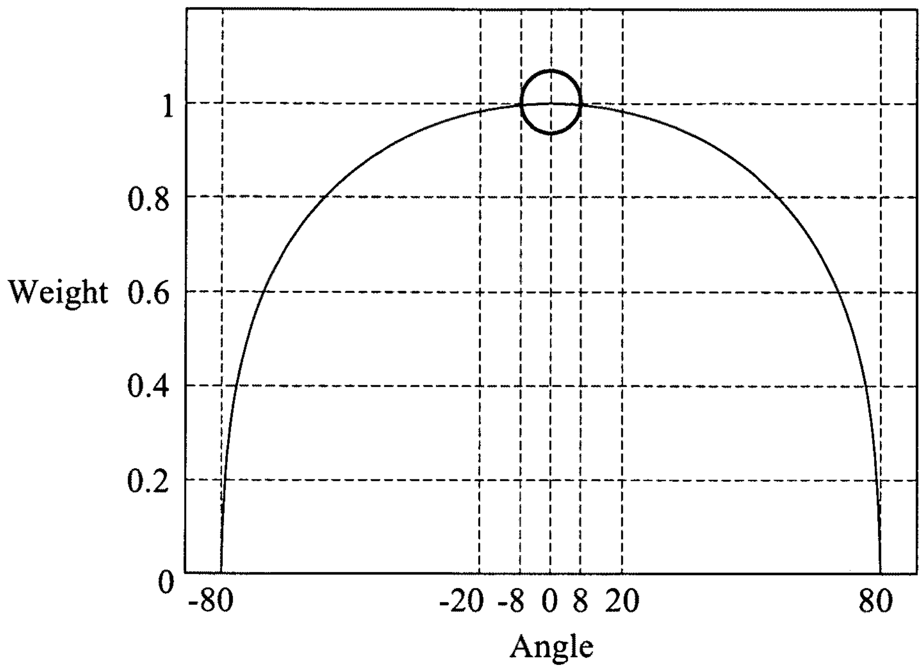
FIG. 4E illustrates a diagram of an example of a weight function applicable to a radiation pattern determination unit according to example embodiments.

FIG. 4E illustrates an example of a weight function applicable to a radiation pattern determination unit according to example embodiments.

The radiation pattern determination unit 318 may apply a weight to a sound source energy of the second dark zone, and may determine the radiation pattern of the far sound field. A weight function of the far sound field may affect a shape of the radiation pattern of the far sound field. A pattern of a sound pressure attenuation in the far sound field may be determined by the weight function of the far sound field. Referring to FIG. 4E, the weight function may have a semicircular shape using the location of the listener as its center. Accordingly, a largest sound pressure attenuation may be observed in the rear of the listener, and the sound pressure may be slightly attenuated as close to sides of the listener. The weight function may be adjusted based on the location of the listener, a number of listeners, an ambient noise, and an environment.

Figure 5:
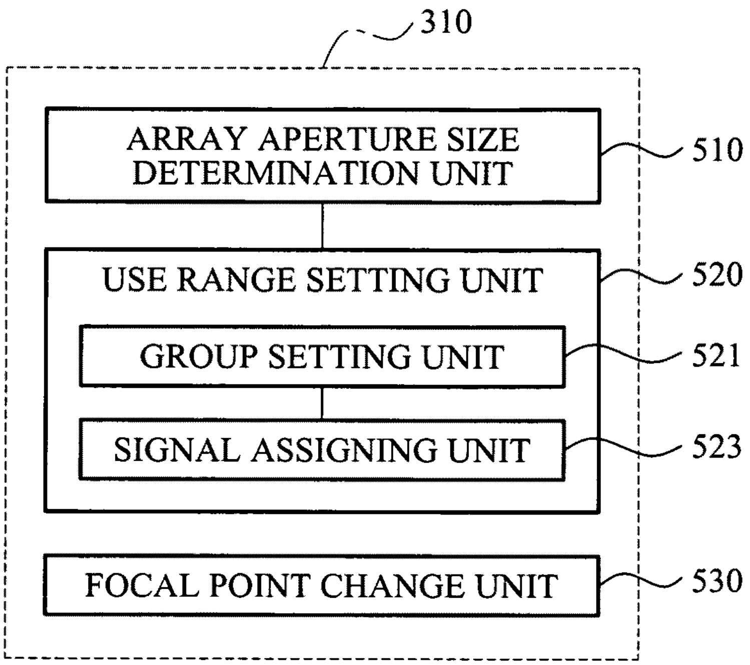
FIG. 5 illustrates a block diagram of a filter generating unit according to example embodiments.

FIG. 5 illustrates a block diagram of the filter generating unit 310 according to example embodiments.

Referring to FIG. 5, the filter generating unit 310 may include, for example, an array aperture size determination unit 510, a use range setting unit 520, and a focal point change unit 530.

The array aperture size determination unit 510 may determine an array aperture size based on a frequency of an input signal and a fixed Rayleigh distance. The use range setting unit 520 may set a use range of an array based on the determined array aperture size. When the Rayleigh distance is matched to the location of the listener, the frequency may be changed and accordingly, the array aperture size may be also changed. When a constant Rayleigh distance "$r_c$" is maintained, an array aperture size "L" may be determined by the following Equation 8:

$$L=\sqrt{2\lambda r_c+\frac{\lambda^2}{4}} \quad \text{[Equation 8]}$$

When the frequency of the input signal is determined, the array aperture size determination unit 510 may determine the array aperture size based on Equation 8. When the array aperture size is determined, the use range setting unit 520 may set the use range of the array in all array speakers based on the determined array aperture size.

The use range setting unit 520 may include, for example, a group setting unit 521, and a signal assigning unit 523. The group setting unit 521 may set array speakers in array groups having different sizes. The signal assigning unit 523 may assign the input signal to the set array groups based on a corresponding frequency band.

Specifically, the group setting unit 521 may set the array groups having different sizes in all array speakers. Here, the array speakers may be arranged in regular intervals, or irregular intervals. The signal assigning unit 523 may assign the input signal to the array groups set in advance, based on a frequency band of a corresponding multi-channel signal during processing of the input signal to the multi-channel signal. For example, a signal of a low-frequency band may be assigned to a group with a large array size, since the signal requires the large array size. Additionally, a signal of a high-frequency band may be assigned to a group with a small array size, since the signal requires a relatively small array size.

Additionally, the use range setting unit 520 may process, in a channel signal, a window filter calculated based on the determined array aperture size, and may set the use range of the array. The use range setting unit 520 may perform filtering corresponding to the array aperture size determined in all the array speakers, through the window filter, and may set the use range of the array based on a result of the filtering.

The focal point change unit 530 may change a focal point in the front or rear of the listener based on the frequency of the input signal, so that a beam width may be maintained at a location of ears of the listener. The focal point change unit 530 may prevent a sound pressure at the location of the ears of the listener from being reduced compared to a high-frequency band with a narrow beam width, by changing the focal point in the front or rear of the listener.

Figure 6A:
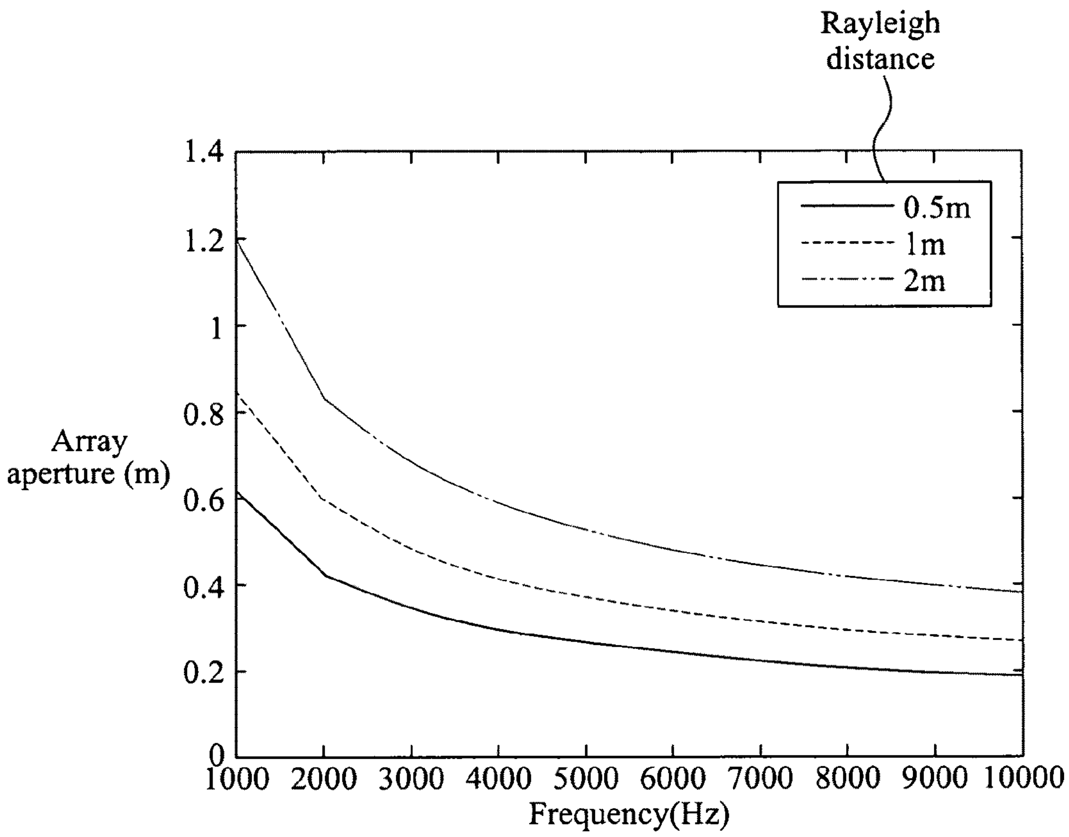
FIG. 6A illustrates a diagram of a relationship between a frequency and an array aperture size according to example embodiments.

FIG. 6A illustrates a relationship between a frequency and an array aperture size according to example embodiments.

Referring to FIG. 6A, the array aperture size may be determined based on a frequency, when a constant Rayleigh distance is maintained. When a Rayleigh distance of 0.5 meters (m) is fixed, the array aperture size may be increased, as a size of the frequency is reduced, as shown in FIG. 6A. Accordingly, to maintain a constant Rayleigh distance at the location of the listener, the array aperture size may be changed depending on a change in the frequency.

Figure 6B:
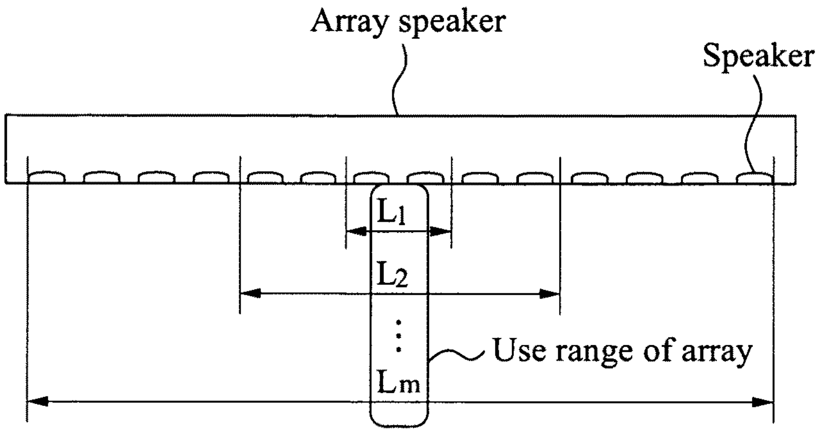
FIG. 6B illustrates a diagram of an example of a use range setting unit according to example embodiments.

FIG. 6B illustrates an example of a use range setting unit 520 according to example embodiments.

Referring to FIG. 6B, the group setting unit 521 may group speakers into groups having different sizes, for example L1, L2, and Lm, based on a use range of the array in all the array speakers. When the array aperture size is determined by the array aperture size determination unit 510, the groups may be set in advance, so that a speaker matched to the determined array aperture size may be operated. Additionally, the group setting unit 521 may set groups so that a channel in each of the groups may have a predetermined frequency band.

Figure 6C:
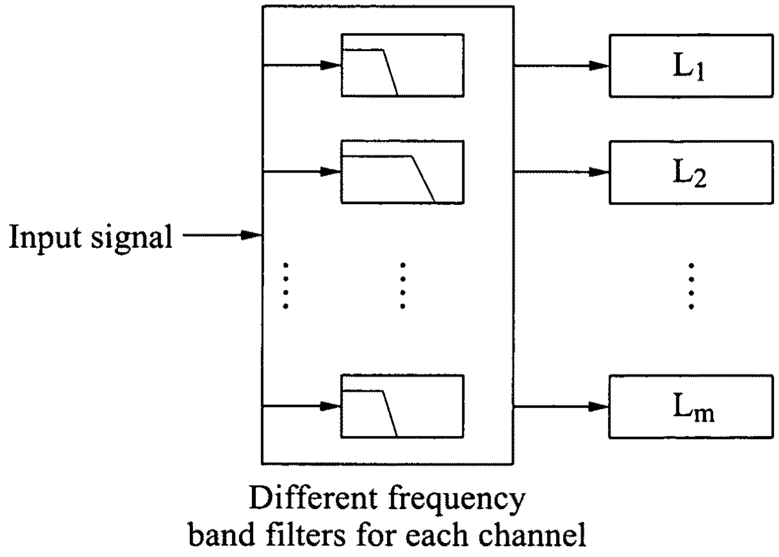
FIG. 6C illustrates a diagram of another example of a use range setting unit according to example embodiments.

FIG. 6C illustrates another example of a use range setting unit 520 according to example embodiments.

Referring to FIG. 6C, an input signal may be filtered based on a frequency band, through different frequency band filters for each channel, and the filtered signal may be assigned to a group for each frequency band. The signal assigning unit 523 may assign the signals passing through the frequency band filters to corresponding groups L1, L2, and Lm that are set in advance. For example, the frequency band filters may include a low-pass filter, a band-pass filter, and a high-pass filter. When an input signal is a low-frequency signal passing sequentially through the frequency band filter and the low-pass filter, the input signal may be assigned to a group with a large size. Additionally, the frequency band filter may be set to be limited to a predetermined frequency band with respect to a channel belonging to a group.

Figure 6D:
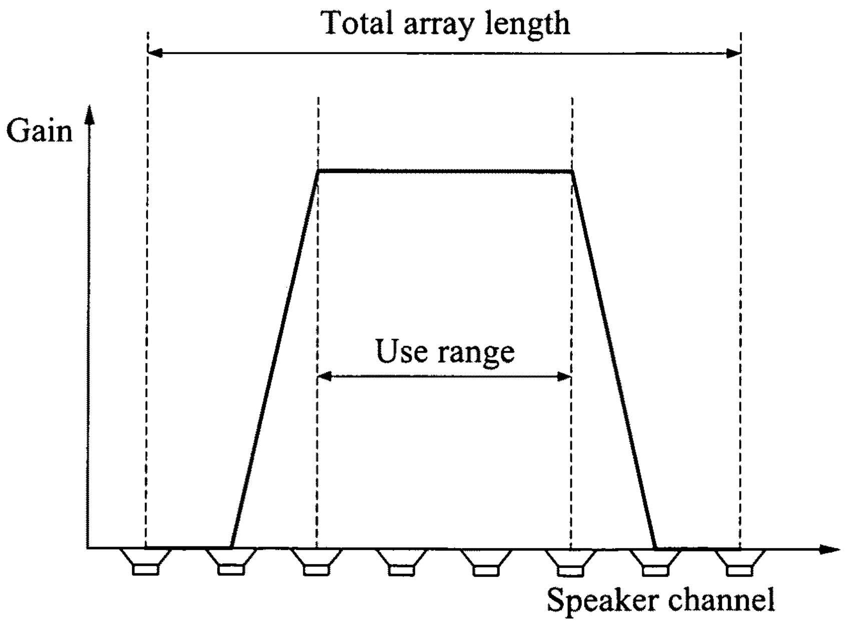
FIG. 6D illustrates a diagram of still another example of a use range setting unit according to example embodiments.

FIG. 6D illustrates still another example of a use range setting unit 520 according to example embodiments.

Referring to FIG. 6D, the use range setting unit 520 may perform, through the window filter, filtering of a range where the array is used based on the array aperture size determined by the array aperture size determination unit 510. The filtering may be performed to adjust the size of the array using a signal processing scheme.

Generally, in digital signal processing, to finitely limit a target signal input to a corresponding system, the target signal may be divided into frames using a window function. Here, the frames refer to signal processing units into which a sound source signal is divided in regular intervals as time changes. Additionally, the window function is a kind of filter used to divide a single sound source signal into consecutive frames, namely, in regular intervals, and to process the frames. The window function may include, for example, the Hamming window function, the Hanning window function, the cosine window function, and the like that have been widely known, and that may be easily recognized by those skilled in the art.

Figure 7:
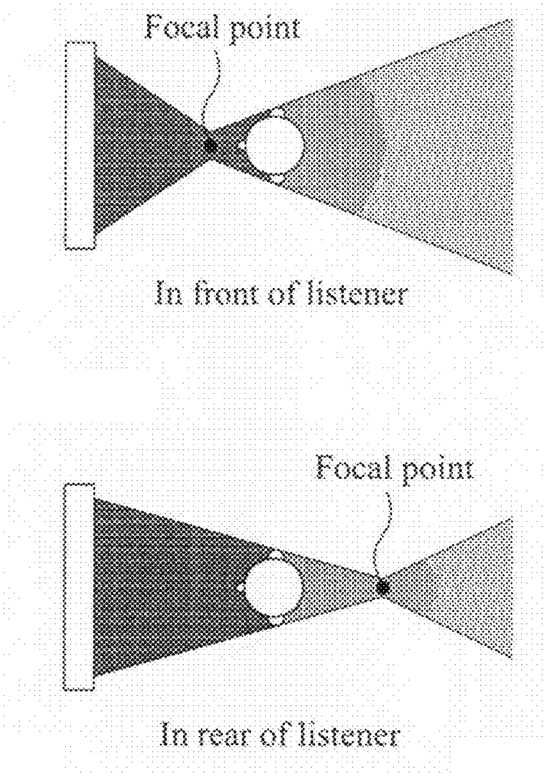
FIG. 7 illustrates a diagram of an example of a focal point change unit according to example embodiments.

FIG. 7 illustrates an example of a focal point change unit according to example embodiments.

When a sound source has a small beam width, a sound pressure at a location of a listener may be reduced, despite a sound pressure attenuation being relatively increased in a far field. Conversely, when the sound source has a large beam width, the sound pressure attenuation in the far field may be reduced. The beam width may be required to be maintained, so that the sound pressure may be maintained at least at a location of both ears of the listener and so that a minimum beam width may be maintained to increase the sound pressure attenuation in the far field at a focusing location. The focal point change unit 530 may maintain the beam width at the location of both the ears of the listener by arranging the focal point at the front or rear of the listener. In other words, it is possible to maintain the beam width at the location of the listener while maintaining a performance of the sound pressure attenuation in the far field by changing the focal point. Here, the focal point refers to a point where focusing is realized. The focal point may be changed by processing a same delay as a phase difference between each speaker and the focal point.

Figure 8A:
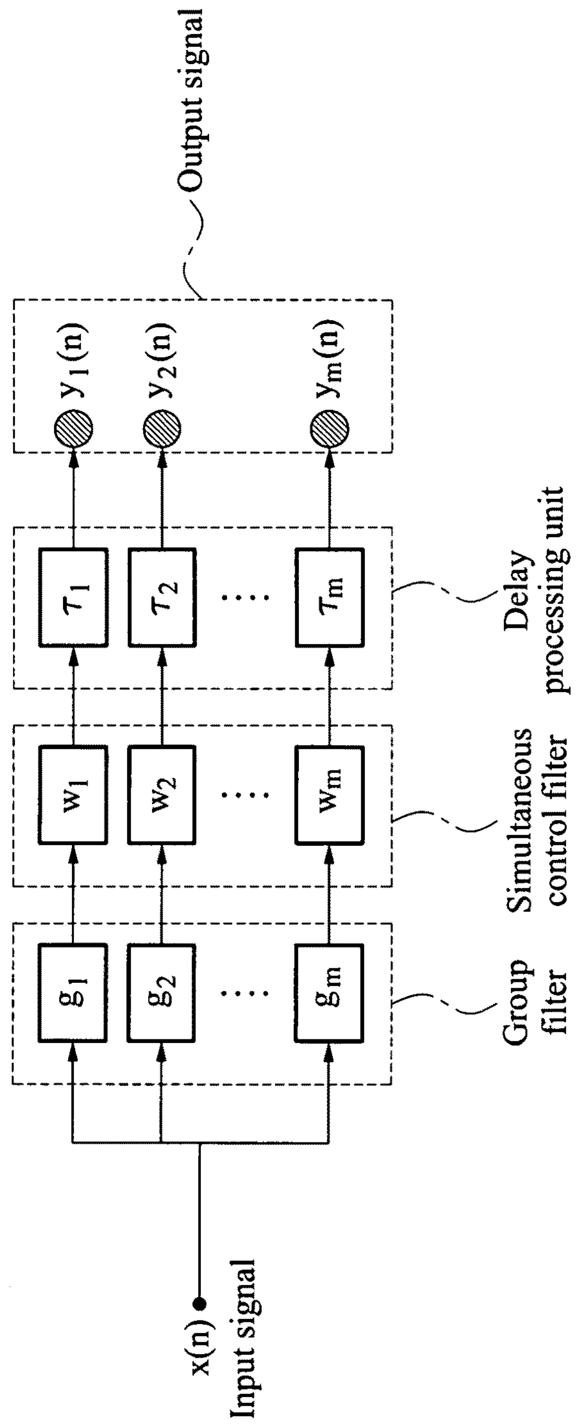
FIG. 8A illustrates a diagram of an example of a filter processing unit according to example embodiments.

FIG. 8A illustrates an example of a filter processing unit 320 according to example embodiments.

Referring to FIG. 8A, the filter processing unit 320 may include a group filter, a simultaneous control filter, and a delay processing unit. The group filter may assign an input signal to a group set to be matched to the array aperture size determined by the array aperture size determination unit 510. The simultaneous control filter may simultaneously control a near sound field and a far sound field that are generated in the filter generating unit 310. The delay processing unit may reflect a change in a focal point. The input signal may be output as a multi-channel signal through the filter processing unit 320. The filter processing unit 320 may also process the input signal by applying only the simultaneous control filter.

Figure 8B:
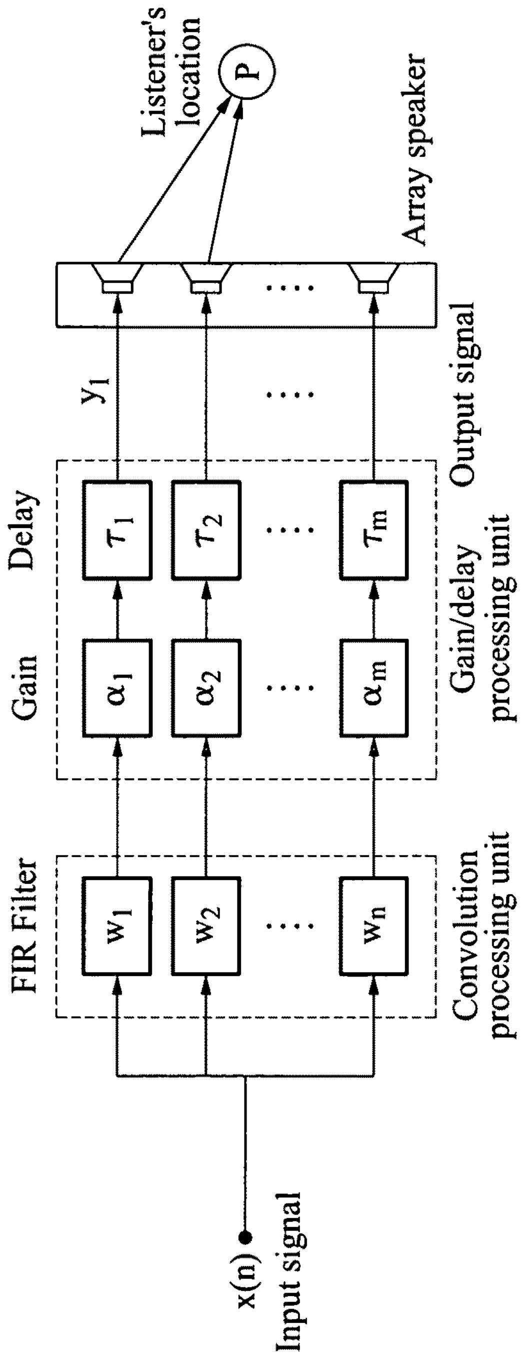
FIG. 8B illustrates a diagram of another example of a filter processing unit according to example embodiments.

FIG. 8B illustrates another example of a filter processing unit 320 according to example embodiments.

Referring to FIG. 8B, the filter processing unit 320 may include a convolution processing unit, and a gain/delay processing unit. The convolution processing unit may perform a convolution processing on an input signal and a filter value of a filter. Here, the filter may be used to simultaneously control a near sound field and a far sound field that are generated in the filter generating unit 310.

Additionally, the filter processing unit 320 may include either the convolution processing unit, or the gain/delay processing unit. A multi-channel signal output from the filter processing unit 320 may be output as a sound beam to a location of a listener via an array speaker.

Figure 9A:
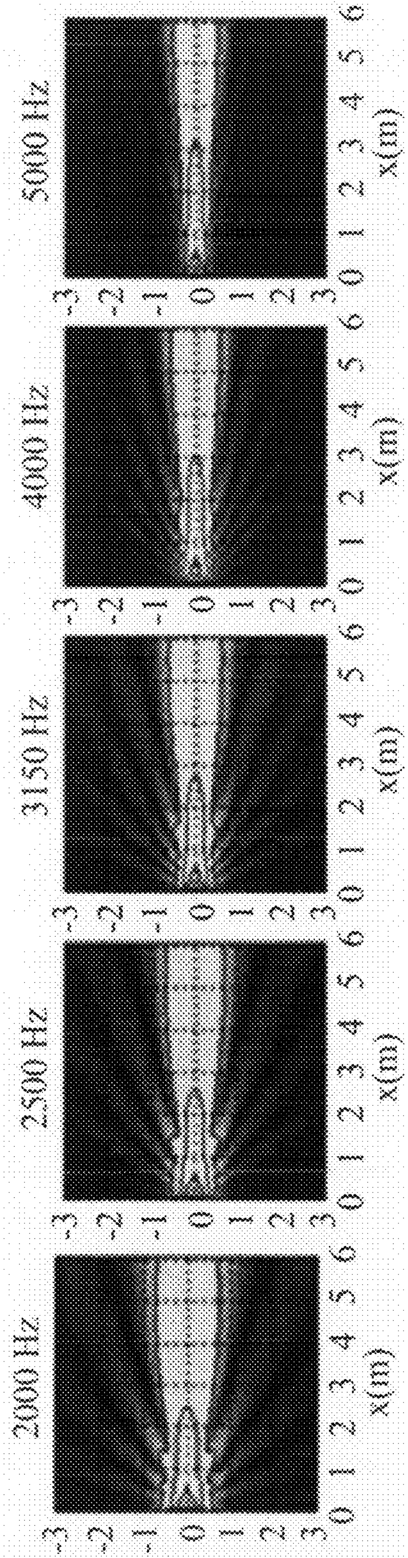
FIG. 9A(CONVENTIONAL ART)
FIGS. 9A and 9B illustrate an effect of an apparatus for simultaneously controlling a near sound field and a far sound field according to example embodiments, compared to a conventional scheme.
Figure 9B:
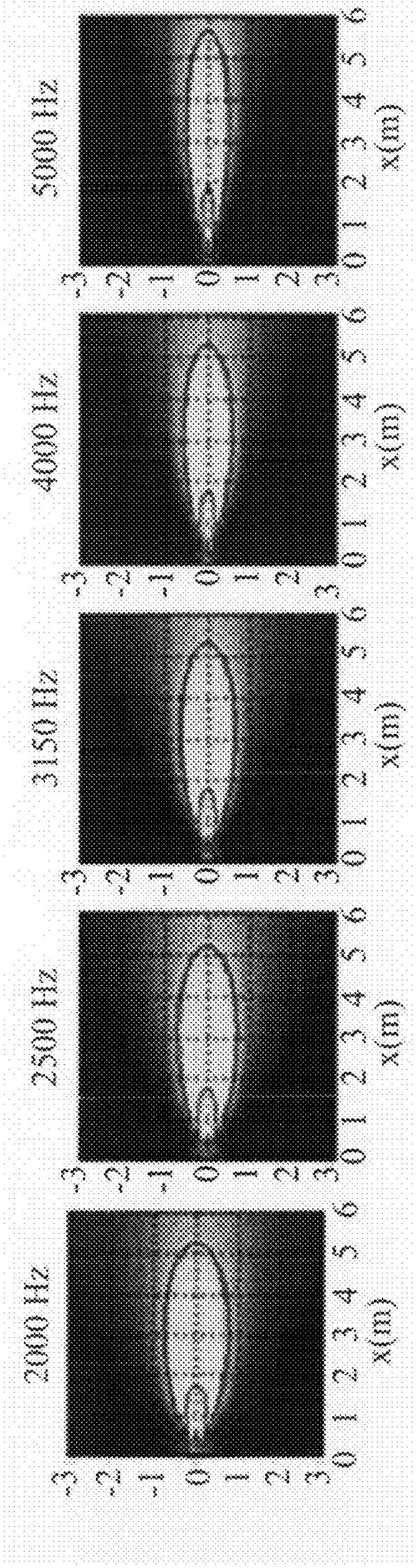

FIGS. 9A and 9B illustrate an effect of an apparatus for simultaneously controlling a near sound field and a far sound field according to example embodiments compared to a conventional scheme.

Referring to FIG. 9A, when a conventional scheme of controlling a beam pattern in a far field is applied, side lobes may occur in a near field, and a directivity in a predetermined direction may be formed, however, an energy may only be slowly attenuated in the predetermined direction. Referring to FIG. 9B, when a scheme of simultaneously controlling a near sound field and a far sound field according to example embodiments is applied, focusing may be realized in the near sound field. Additionally, a sound pressure may be rapidly attenuated in the far sound field, compared with the conventional scheme of FIG. 9A. Therefore, it is possible to form an effective PSZ by simultaneously controlling the near sound field and the far sound field using different manners at a location of a listener.

Figure 9C:
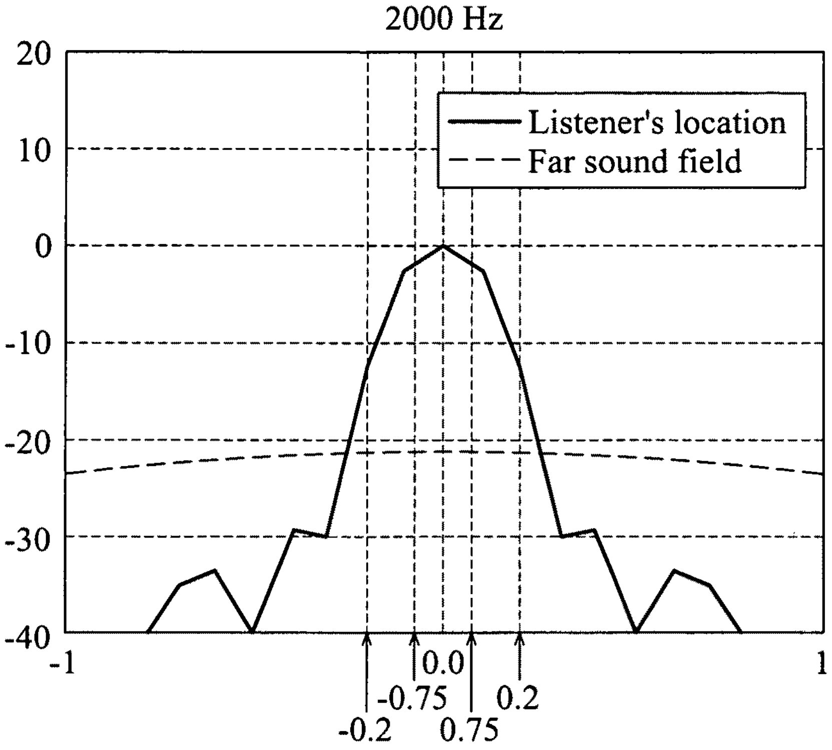
FIG. 9C illustrates a diagram of a beam pattern at a location of a listener and a beam pattern in a far sound field according to example embodiments.

FIG. 9C illustrates a beam pattern at a location of a listener and a beam pattern in a far sound field.

Referring to FIG. 9C, a low sound pressure is maintained in the far sound field. At the location of the listener, namely in a near sound field, a maximum sound pressure is maintained at a location of a listener's head in a range of −0.75 centimeters (cm) to 0.75 cm, based on a center of an array speaker. The sound pressure at the location of the listener may be attenuated as the array speaker is far from the location of the listener's head. Accordingly, focusing may be realized at the location of the listener's head, and the sound pressure may be attenuated in other locations and thus, it is possible to form a relatively effective PSZ.

Figure 10:
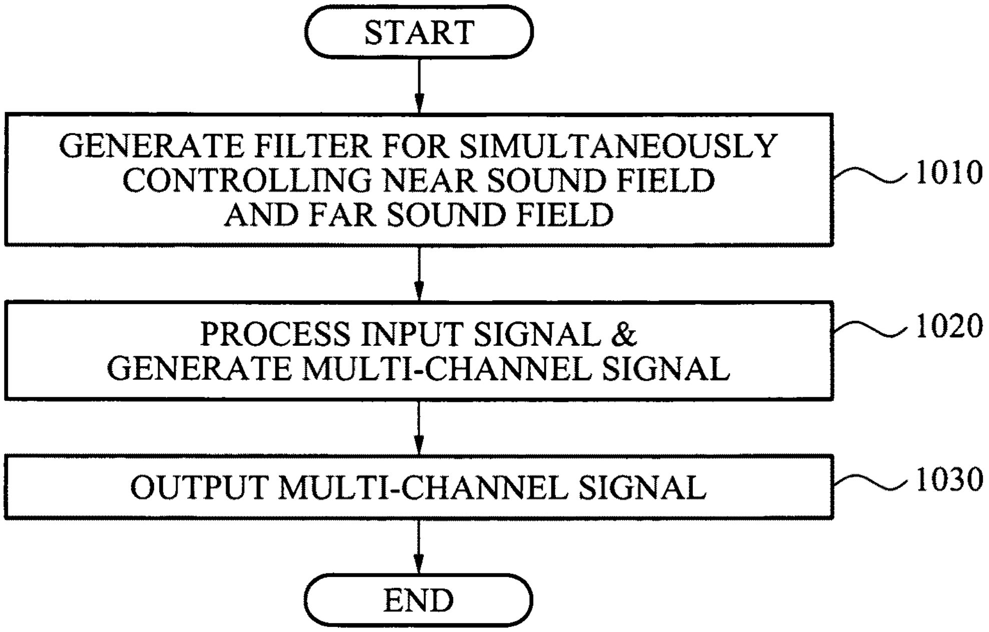
FIG. 10 illustrates a flowchart of a method of simultaneously controlling a near sound field and a far sound field according to example embodiments.

FIG. 10 illustrates a flowchart of a method of simultaneously controlling a near sound field and a far sound field according to example embodiments.

In operation 1010, an apparatus for simultaneously controlling a near sound field and a far sound field may generate a filter used to simultaneously control the near sound field and the far sound field based on a ratio of a sound pressure energy at a location of a listener to a sound pressure energy obtained by summing sound pressure energies of a first dark zone and a second dark zone. Also, the apparatus may generate a filter that has a higher sound pressure at the location of the listener compared with a location around the listener, and that is used to control a sound pressure attenuation based on a distance in the second dark zone.

Additionally, the apparatus may set a near-field region based on the location of the listener, may classify the near-field region into the location of the listener and the first dark zone of the location around the listener, and may classify a far-field region spaced by a predetermined distance from the location of the listener as the second dark zone.

The apparatus may determine a beam width of a multi-channel signal by applying a weight based on the sound pressure at the location of the listener. Additionally, the apparatus may determine a beam pattern of the near sound field by applying a weight based on a sound pressure attenuation in the near sound field in the first dark zone, and may determine a radiation pattern of the far sound field by applying a weight based on a sound pressure attenuation in the far sound field in the second dark zone. Furthermore, the apparatus may apply a control weight to a factor controlling the beam pattern of the near sound field and a factor controlling the radiation pattern of the far sound field. Here, the control weight may be used to simultaneously control the near sound field and the far sound field.

The apparatus may determine an array aperture size based on a frequency of the input signal and a fixed Rayleigh distance, and may set a use range of an array based on the determined array aperture size.

The apparatus may change a focal point in the front or rear of the listener based on the frequency of the input signal.

In operation 1020, the apparatus may process a filter value of the generated filter and an input signal, and may generate a multi-channel signal. Here, the multi-channel signal may have a higher sound pressure at the location of the listener compared with the location around the listener, and may enable a sound pressure attenuation in the far field with respect to the input signal.

In operation 1030, the apparatus may output the multi-channel signal. Here, an array speaker may be used to output the multi-channel signal.

According to example embodiments, an apparatus for simultaneously controlling a near sound field and a far sound field may be applied, as a sound playback apparatus using an array speaker, to various audio signal transmission devices requiring an independent sound zone when a sound source is played back. Additionally, the apparatus may also be applied to an array device including multiple transducers mounted therein, and to a personal electronic product requiring listening of sound for individual use only without generating noise around a listener. The personal electronic product may include, for example, a monitor, a portable music player, a Digital Television (DTV), and a Personal Computer (PC).

The methods according to the above-described example embodiments may be recorded in non-transitory computer-readable media or processor-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Examples of computer-readable media or processor-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer or processor using an interpreter. The methods described herein may be executed on a general purpose computer or processor or may be executed on a particular machine such as the apparatus for simultaneously controlling a near sound field and a far sound field described herein.

The described hardware units may also be configured to act as one or more software modules in order to perform the operations of the above-described embodiments. Any one or more of the software modules described herein may be executed by a dedicated processor unique to that unit or by a processor common to one or more of the modules.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An apparatus for simultaneously controlling a near sound field and a far sound field, the apparatus comprising:

a filter generating unit to generate a filter to simultaneously control the near sound field and the far sound field based on a ratio of a first sound pressure energy at a location of a listener to a second sound pressure energy related to the far sound field and the near sound field excluding the location of the listener wherein the near sound field corresponds to a region from a sound source to the location of the listener; and a filter processing unit to generate a multi-channel signal by processing a filter value of the generated filter and an input signal, wherein the second sound pressure energy is obtained based on sound pressure enemies of a first dark zone, which corresponds to a region excluding the location of the listener from the near sound field, and a second dark zone which corresponds to the far sound field.

2. The apparatus of claim 1, wherein the filter generating unit comprises:

a near-field setting unit to set a near-field region based on the location of the listener; and a region classifying unit to classify the near-field region into the location of the listener and the first dark zone of the location around the listener, and to classify a far-field region spaced by a predetermined distance from the location of the listener as the second dark zone.

3. The apparatus of claim 1, wherein the filter generating unit comprises:

a beam width determination unit to determine a beam width of the multi-channel signal by applying a weight based on the sound pressure at the location of the listener;

a beam pattern determination unit to determine a beam pattern of the near sound field by applying a weight based on a sound pressure attenuation in the near sound field in the first dark zone;

a radiation pattern determination unit to determine a radiation pattern of the far sound field by applying a weight based on a sound pressure attenuation in the far sound field in the second dark zone; and a control weight applying unit to apply a control weight to a factor controlling the beam pattern of the near sound field and a factor controlling the radiation pattern of the far sound field, the control weight being used to simultaneously control the near sound field and the far sound field.

4. The apparatus of claim 3, wherein the control weight applying unit applies the control weight so that a first control weight applied to the factor controlling the beam pattern of the near sound field is inversely proportional to a second control weight applied to the factor controlling the radiation pattern of the far sound field.

5. The apparatus of claim 1, wherein the filter processing unit comprises:

a convolution processing unit to perform a convolution processing on the filter value and the input signal in real-time, and to generate the multi-channel signal based on the convolution processing.

6. The apparatus of claim 1, wherein the filter processing unit comprises:

a gain/delay processing unit to process the input signal using a gain value and a delay value, set in advance.

7. The apparatus of claim 1, wherein the filter generating unit generates a filter for simultaneously controlling the near sound field and the far sound field, based on information of a transfer function from each of a plurality of array speakers to the location of the listener and information of a transfer function from each of the array speakers to a location of the far field.

8. The apparatus of claim 7, wherein the information of the transfer function comprises information of a transfer function based on a theoretically modeled sound source.

9. The apparatus of claim 7, wherein the information of the transfer function comprises information of a transfer function directly measured using a microphone at the location of the listener and another microphone at the location of the far field.

10. The apparatus of claim 1, wherein the filter generating unit comprises:

an array aperture size determination unit to determine an array aperture size based on a frequency of the input signal and a fixed Rayleigh distance; and a use range setting unit to set a use range of an array based on the determined array aperture size.

11. The apparatus of claim 10, wherein the use range setting unit comprises:

a group setting unit to set array speakers in array groups having different sizes; and a signal assigning unit to assign the input signal to the set array groups based on a corresponding frequency band.

12. The apparatus of claim 10, wherein the use range setting unit processes, in a channel signal, a window filter calculated based on the determined array aperture size, and sets the use range of the array.

13. The apparatus of claim 1, wherein the filter generating unit comprises:

a focal point change unit to change a focal point in a front or rear of the listener based on a frequency of the input signal, so that a beam width is maintained at a location of ears of the listener.

14. The apparatus of claim 1, further comprising an output unit to output the multi-channel signal via an array speaker.

15. The apparatus of claim 1, wherein in the filter generating unit, the filter is generated to control a sound pressure attenuation based on a distance in the second dark zone.

16. A method for simultaneously controlling a near sound field and a far sound field, the method comprising:

generating a filter to simultaneously control the near sound field and the far sound field based on a ratio of a first sound pressure energy at a location of the listener to a second sound pressure energy related to the far sound field and the near sound field excluding the location of the listener, wherein the near sound field corresponds to a region from a sound source to the location of the listener; and generating, by way of a processor, a multi-channel signal by processing a filter value of the generated filter and an input signal, wherein the second sound pressure energy is obtained based on sound pressure energies of a first dark zone, which corresponds to a region excluding the location of the listener from the near sound field, and a second dark zone which corresponds to the far sound field.

17. The method of claim 16, wherein the generating of the filter comprises:

setting a near-field region based on the location of the listener; and classifying the near-field region into the location of the listener and the first dark zone of the location around the listener, and classifying a far-field region spaced by a predetermined distance from the location of the listener as the second dark zone.

18. The method of claim 16, wherein the generating of the filter comprises:

determining a beam width of the multi-channel signal by applying a weight based on the sound pressure at the location of the listener;

determining a beam pattern of the near sound field by applying a weight based on an attenuation of a near-field sound pressure in the first dark zone;

determining a radiation pattern of the far sound field by applying a weight based on an attenuation of a far-field sound pressure in the second dark zone; and applying a control weight to a factor controlling the beam pattern of the near sound field and a factor controlling the radiation pattern of the far sound field, the control weight being used to simultaneously control the near sound field and the far sound field.

19. The method of claim 16, wherein the generating of the filter comprises:

determining an array aperture size based on a frequency of the input signal and a constant Rayleigh distance; and setting a use range of an array based on the determined array aperture size.

20. The method of claim 16, wherein the generating of the filter comprises:

changing a focal point at a rear or a front of the listener based on the frequency of the input signal, so that a beam width is maintained at the location of the listener.

21. The method of claim 16, wherein the filter is generated to control a sound pressure attenuation based on a distance in the second dark zone.

22. An apparatus for simultaneously controlling a near sound field and a far sound field, the apparatus comprising:

a filter generating unit to generate a filter to simultaneously control the near sound field and the far sound field based on a ratio of a sound pressure energy at a location of a listener to a sound pressure energy obtained by summing sound pressure energies of a first dark zone and a second dark zone, wherein all of the second dark zone is located farther from the array speaker than the first dark zone, wherein the first dark zone comprises a zone obtained by excluding a personal sound zone where the listener is located from the near sound field, wherein the near sound field is a sound field in a region from a sound source to the location of the listener; and a filter processing unit to generate a multi-channel signal by processing a filter value of the generated filter and an input signal.

23. The apparatus of claim 1, wherein the first dark zone comprises a zone obtained by excluding a personal sound zone where the listener is located from the near sound field.

24. The apparatus of claim 1, wherein the second sound pressure energy is obtained by summing sound pressure energies of a first dark zone and a second dark zone.

* * * * *

UNITED STATES PATENT AND TRADEMARK OFFICE

CERTIFICATE OF CORRECTION

PATENT NO. : 9,219,974 B2
APPLICATION NO. : 13/064948
DATED : December 22, 2015
INVENTOR(S) : Jung Woo Choi et al.

It is certified that error appears in the above-identified patent and that said Letters Patent is hereby corrected as shown below:

Claims

Claim 1, Column 16, Line 39:
Delete "enemies" and insert -- energies --, therefor.

Signed and Sealed this
Thirty-first Day of May, 2016

Michelle K. Lee

Michelle K. Lee
*Director of the United States Patent and Trademark Office*